UNITED STATES PATENT OFFICE.

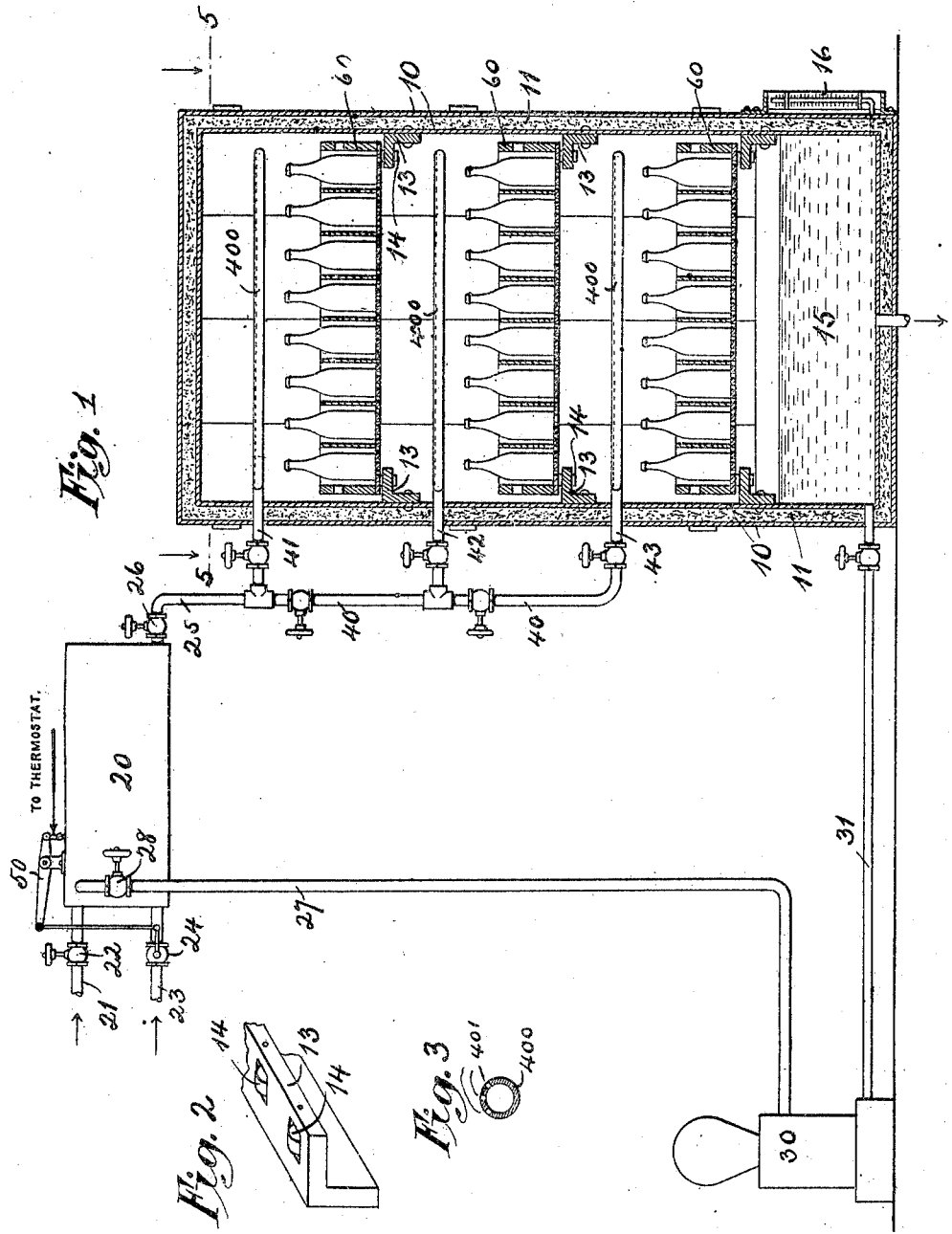

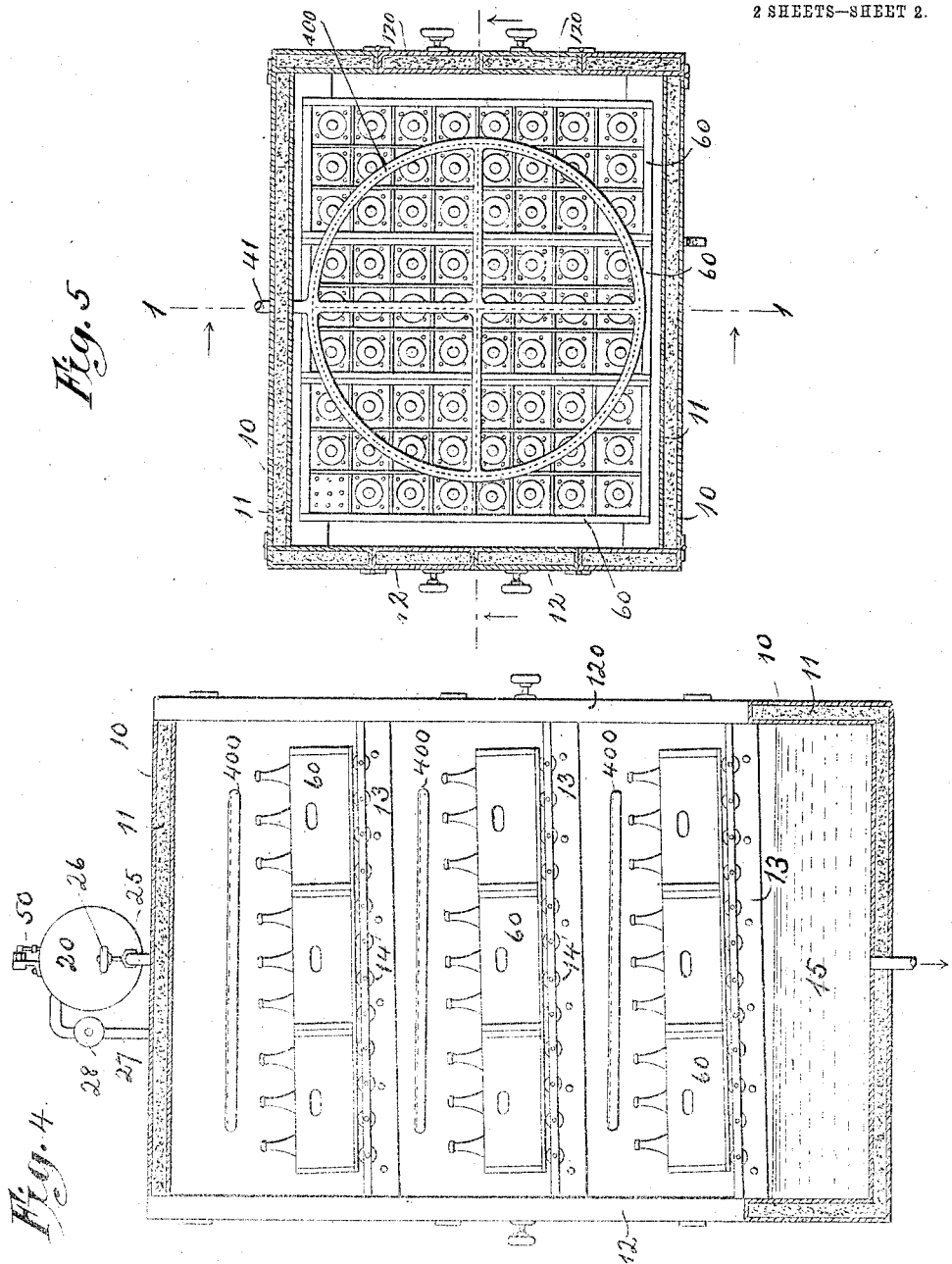

CHARLES H. LOEW, OF LAKEWOOD, OHIO.

PASTEURIZER.

No. 817,495.     Specification of Letters Patent.     Patented April 10, 1906.

Application filed February 7, 1905. Serial No. 244,578.

*To all whom it may concern:*

Be it known that I, CHARLES H. LOEW, a citizen of the United States, residing at Lakewood, in the county of Cuyahoga and State of Ohio, have invented certain new and useful Improvements in Pasteurizers, of which the following is a specification.

My invention relates to an apparatus for the pasteurization of beer in bottles, and its novelty consists in the construction and adaptation of the parts and in the means employed to effectuate the purpose desired.

The pasteurization of beer in bottles is accomplished if the beer can be maintained a sufficient length of time—say from about twenty to thirty minutes—at a temperature, say, of about 145° Fahrenheit, which will prevent the further development of the yeast in the beer. The higher temperature must be avoided, as it cooks the beer, and a lower temperature is not efficient.

Beer has been usually pasteurized of late years by conveying the bottles either singly or in groups through hot water. Now it must be remembered that beer is bottled usually at a temperature of 36° Fahrenheit or thereabout. Consequently conveying the bottles directly into water of the necessarily much higher pasteurizing temperature causes much breakage. Breakage under this circumstance means not only the direct loss of the beer in the bottle and the loss of the bottle itself, but it also means the contamination of the water used as the pasteurizing medium with the acid contained in the beer, which rusts the iron tanks and other parts in which these operations are carried on.

Attempts have been made to prevent such breakage by preheating the bottles before they are placed in the heated bath; but after all there is always the line of juncture between the body of liquid and the air above it and always a time when the bottle is only partly immersed, and it is at this point where the danger lies and where breakage occurs. A similar danger-point exists when the bottles emerge from the heated bath into a cooler atmosphere.

I have had much experience in this art, and I have discovered that when the bottles filled with the comparatively cold beer are brought into the presence of a warm vapor, even although it be not much warmer than the temperature of the beer, a fine film of moisture immediately forms on the outside of the bottles, and if a much warmer fluid is then brought into contact with the outside of such bottles they no not break, being protected by the film of condensed vapor on their surface.

The purpose of my invention is to overcome these difficulties, and I do so by the simple and efficient means which forms the subject-matter of this application and which consists, briefly, of a closed chamber into which the bottles are introduced and in which they remain at rest during the operation; means for supplying thereto a spray of water directed to fall upon the bottles in a fine rain; means for gradually raising the temperature of the sprayed water until the desired pasteurizing temperature is reached in the bottles; means for maintaining the said temperature during a proper length of time, and means for then gradually decreasing the temperature of the spray to cool the bottles, so that they may be safely handled.

It also consists of suitable appliances and adjuncts necessary to the operation and control of the means stated.

In the drawings there is illustrated a preferred form of my apparatus.

Figure 1 is a front elevation and partial vertical section of the same. Fig. 2 is an enlarged detail in perspective of part of one of the slideways. Fig. 3 is an enlarged transverse section of one of the spraying-pipes. Fig. 4 is a vertical longitudinal section of the apparatus; and Fig. 5 is a horizontal sectional view on the plane of the line 5 5 of Fig. 1 looking downward.

In the drawings, there is illustrated a box or chamber made of any suitable size and material, but preferably of steel, and the walls 10 of which are lined with suitable insulating material 11, as mineral wool. It is provided with doors 12 12 at one side and similar doors 120 120 at the other side. Along the walls are arranged brackets or slideways 13 13 in pairs made of angle-iron or other suitable construction and which dip slightly from one end of the chamber to the other to facilitate the travel toward the latter of boxes containing the beer-bottles. If deemed desirable, these slideways may be provided with little friction-rollers 14 14; but in most cases these would not be necessary. The bottom portion 15 of the chamber is a water-tank, and it is provided with an external water-gage 16.

In close proximity to this chamber and preferably conveniently arranged above it is the water-tempering chamber 20. This consists of a closed vessel of steel or other suitable material and having a capacity of several gallons. It is provided with a water-supply pipe 21, having a valve 22, a steam-supply pipe 23, having a valve 24, a spraying-system pipe 25, having a valve 26, and a pump-pipe 27, having a valve 28. The pipe 21 may be connected to any suitable source of water-supply, (not shown,)—as, for instance a city main or reservoir. The pipe 23 may be connected with the exhaust system of the steam-engine or with any other source of steam under pressure. Also in close proximity to the pasteurizing-chamber is a pump (indicated at 30) which may be of any suitable form or size and which is connected to the reservoir 15 at the bottom of the chamber 10 by a pipe 31 and to the water-tempering chamber 20 by another pipe 27, above referred to.

Arranged alongside of and partly within the pasteurizing-chamber is the spraying system. This comprises the pipe 25, leading from the chamber 20 to the vertical pipe 40, which is provided with branches 41 42 43, which are each supplied with suitable valves, and each of which terminates in an atomizing rose or nozzle 400, whereby the water coming through the branch pipe and supplied thereto is projected upward in the form of a fine spray.

A thermostat of any approved form is arranged in close proximity to the water-tempering chamber and is so arranged that it controls the valve 24 of the steam-supply pipe 23 through the lever 50, so that if the temperature of the water in the chamber 20 rises above the point at which the thermostat is set the valve 24 will be shut to cut off the supply of steam, and if the temperature falls below that point the valve is opened to admit the steam thereto. Such thermostats are well known, and their special construction and mode of operation form no part of this invention.

The boxes 60 containing the beer in bottles are simple trays divided into compartments, each of the latter being adapted to hold one bottle. The trays, however, must have a perforated bottom to permit of the water with which the bottles are sprayed to drip therefrom. Woven wire forms a good material for these boxes or trays; but their form and material is unimportant so long as they hold the bottles safely and allow the water to pass downward from them.

The mode of using the apparatus is as follows: The doors 12 are closed and the doors 120 opened. The workmen place the boxes containing the beer-bottles upon the slideways, and the boxes slide down to the other side of the apparatus. This is continued until the pasteurizing-chamber is all filled. The doors 120 are then closed. The valves 22 and 26 and the valves on the branch pipes 41, 42, and 43 are then opened and water from the pipe 22 flows into the water-tempering chamber 20 until it is filled and water begins to flow into the spraying system through the pipe 40 and is forced through the nozzle 400 upward and striking against the roof of the pasteurizing-chamber or the bottoms of the bottle-boxes, as the case may be, falls upon the bottles within the boxes in the form of a fine rain or spray and begins to accumulate in the reservoir or tank 15, its depth being ascertained by an inspection of the water-gage 16. The valve 24 is then opened and connected with the thermostat 50, and as soon as the water in the tank 15 nearly fills the latter the pump 30 is started and begins to pump the water from the tank 15 through the pipe 31, pump 30, and pipe 27 back into the water-tempering chamber 20, where it is again heated by the steam and used over again through the spraying system. By these steps it will be observed that the spray first falling upon the bottles is of a temperature of the water in the supply-pipe 21. The steam warms these gradually as it circulates through the tempering-chamber 20 until a point is reached where it is kept at the temperature desired by the action of the thermostat. This latter should be set at a temperature a few degrees higher than that at which it is desired to keep the beer in the bottles to allow for inevitable losses by radiation and conduction. After the proper temperature has been maintained long enough the thermostat is disconnected and the steam shut off, but the pump 30 is kept in operation constantly to spray the bottles with the water, which gradually becomes cooler and finally reaches the normal temperature. The pump is then stopped. The doors 12 are then opened and the boxes removed. If it is desired to cool the bottles still further, the water in the supply-pipe is cooled gradually to the desired temperature by passing the same through a refrigerating medium or in any other convenient way.

It will be observed that using the apparatus in the manner described, the bottles containing the beer have been first sprayed with a fine rain or spray of water at a temperature near the normal, that this temperature has been gradually increased until the pasteurizing temperature has been reached, and that the latter temperature has been maintained until pasteurization has been effected, when the temperature has been gradually decreased. These steps, moreover, have been effected in such a way as not to produce any sudden changes in temperature, and consequently there has occurred no breakage of the bottles. The bottles have remained stationary during the operation and no power has been required to move them. The only expense attendant upon the operation is that of the steam employed to heat the water and the cost of running the pump. Both of these are small. Using the water over and over effects a great economy, because it is pumped from the collecting or drip tank back to the tempering-chamber before it has time to lose much of its heat. The temperature within the pasteurizing-chamber is practically uniform.

Modification can readily be made by the skilled workman in the form and material of the apparatus without departing from its essential principles; but the apparatus above described is the form which in the light of my present knowledge seems preferable.

What I claim as new is—

1. An apparatus for pasteurizing beer in bottles comprising a pasteurizing-chamber, a spraying mechanism within the chamber, means for supplying water thereto and means for gradually heating the water so supplied without interrupting its flow.

2. An apparatus for pasteurizing beer in bottles comprising a pasteurizing-chamber, a spraying mechanism within the chamber, means for supplying water thereto and means for gradually heating the water so supplied without interrupting its flow, consisting of a water-tempering chamber provided with a steam-supply pipe.

3. An apparatus for pasteurizing beer in bottles comprising a pasteurizing-chamber, a spraying mechanism within the chamber, means for supplying water thereto and means for gradually heating the water so supplied without interrupting its flow, consisting of a water-tempering chamber provided with a steam-supply pipe, and means, as a thermostat, adapted to control and regulate the steam-supply.

4. An apparatus for pasteurizing beer in bottles comprising a pasteurizing-chamber, a spraying mechanism within the chamber, means for supplying water thereto and means for gradually heating the water so supplied without interrupting its flow, until a predetermined temperature for the spray is arrived at and means for maintaining said temperature a suitable length of time.

5. An apparatus for pasteurizing beer in bottles comprising a pasteurizing-chamber, a spraying mechanism within the chamber, means for supplying water thereto and means for gradually heating the water so supplied without interrupting its flow, until a predetermined temperature for the spray is arrived at and means for maintaining said temperature a suitable length of time, consisting of a water-tempering chamber, a steam-supply pipe and a thermostat regulated by the temperature within the water-tempering chamber and controlling the steam-supply accordingly.

6. An apparatus for pasteurizing beer in bottles comprising a pasteurizing-chamber, a spraying mechanism within the chamber, means for supplying water thereto, means for gradually heating the water so supplied without interrupting its flow, means for collecting the said water after use, and means for restoring its temperature and returning it to the spraying mechanism.

7. An apparatus for pasteurizing beer in bottles comprising a pasteurizing-chamber, a spraying mechanism within the chamber, means for supplying water thereto, means for gradually heating the water so supplied without interrupting its flow, means for collecting the said water after use, and means for restoring its temperature and returning it to the spraying mechanism, consisting of a drip-tank, a pump, a water-tempering chamber provided with a steam-pipe.

8. An apparatus for pasteurizing beer in bottles comprising a pasteurizing-chamber, means for supporting bottles therein, a plurality of spraying devices each arranged above a suitable number of bottles, a common means for supplying the spraying devices with heated water and means for heating the water.

9. In an apparatus of the kind described, a pasteurizing-chamber, a plurality of spraying devices arranged one above another within the chamber, means intermediate for supporting the bottles under each spraying device, each support being adapted to allow the water to pass through the same, a drip-tank at the bottom of the chamber and means whereby the water from the drip-tank is conveyed to the spraying devices under pressure.

10. An apparatus for pasteurizing beer in bottles comprising a pasteurizing-chamber, a spraying mechanism within the chamber, means for supplying water thereto and means for gradually heating the water so supplied without interrupting its flow, until a predetermined temperature for the spray is arrived at and means for maintaining said temperature a suitable length of time, and means for finally reducing the temperature.

In testimony whereof I affix my signature in presence of two witnesses.

CHAS. H. LOEW.

Witnesses:
FRED. H. BIERMANN,
EMMA L. HARMON.